United States Patent
Tian

(10) Patent No.: US 11,587,560 B2
(45) Date of Patent: Feb. 21, 2023

(54) VOICE INTERACTION METHOD, DEVICE, APPARATUS AND SERVER

(71) Applicant: Beijing Baidu Netcom Science and Technology Co., Ltd., Beijing (CN)

(72) Inventor: Chao Tian, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 115 days.

(21) Appl. No.: 16/164,608

(22) Filed: Oct. 18, 2018

(65) Prior Publication Data

US 2019/0237070 A1 Aug. 1, 2019

(30) Foreign Application Priority Data

Jan. 31, 2018 (CN) .......................... 201810097235.5

(51) Int. Cl.
*G10L 15/22* (2006.01)
*G10L 21/0216* (2013.01)
(Continued)

(52) U.S. Cl.
CPC .............. *G10L 15/22* (2013.01); *G06F 3/167* (2013.01); *G10L 21/0216* (2013.01);
(Continued)

(58) Field of Classification Search
CPC ... G10L 15/22; G10L 2015/223; G10L 15/30; H04M 1/6066; H04M 1/271;
(Continued)

(56) References Cited

U.S. PATENT DOCUMENTS 10,965,391 B1 * 3/2021 Luke ....................... G10L 15/22
2009/0204410 A1 * 8/2009 Mozer ..................... G10L 15/30
704/275

(Continued)

FOREIGN PATENT DOCUMENTS

CN 201667653 U 12/2010
CN 103944598 A 7/2014
(Continued)

OTHER PUBLICATIONS

First Chinese Office Action dated Apr. 14, 2020, received for corresponding Chinese Application No. 201810097235.5, 22 pages.
(Continued)

*Primary Examiner* — Mark Villena
(74) *Attorney, Agent, or Firm* — Kinney & Lange, P.A.

(57) ABSTRACT

A voice interaction method is provided. The method is applied to a wearable set and includes: collecting voice information through at least two microphones; processing the voice information and determining that the voice information comprises an effective voice instruction; wherein the effective voice instruction is issued by a user for a mobile terminal; and transmitting the effective voice instruction to the mobile terminal. In an embodiment, the processing of the voice information is assigned to an external device, which reduces the power consumption of a mobile terminal; and voice information is collected by at least two microphones to improve an efficiency and quality of a voice collection.

10 Claims, 5 Drawing Sheets

(51) Int. Cl.
*G06F 3/16* (2006.01)
*G10L 21/0208* (2013.01)

(52) U.S. Cl.
CPC .... *G10L 21/0208* (2013.01); *G10L 2015/225* (2013.01); *G10L 2021/02165* (2013.01)

(58) Field of Classification Search
CPC ............ H04M 1/6058; H04M 1/6091; H04M 2201/40; H04M 2250/02; G06F 3/167
See application file for complete search history.

(56) References Cited

U.S. PATENT DOCUMENTS

| | | | | |
|---|---|---|---|---|
| 2010/0041447 | A1* | 2/2010 | Graylin | G10L 15/26 455/575.2 |
| 2010/0330908 | A1* | 12/2010 | Maddern | H04M 1/6058 455/41.2 |
| 2015/0110263 | A1* | 4/2015 | Johnston | H04R 1/1041 379/430 |
| 2015/0121227 | A1* | 4/2015 | Peng | G10L 13/047 715/727 |
| 2015/0189048 | A1* | 7/2015 | McLaughlin | H04M 1/04 455/569.1 |
| 2016/0006849 | A1* | 1/2016 | Yang | H04M 3/42051 455/415 |
| 2016/0180847 | A1* | 6/2016 | Yang | G10L 15/30 704/270.1 |
| 2018/0063308 | A1* | 3/2018 | Crystal | G06F 3/017 |
| 2018/0233138 | A1* | 8/2018 | Talwar | G06F 3/167 |
| 2018/0240463 | A1* | 8/2018 | Perotti | G10L 17/22 |
| 2019/0074023 | A1* | 3/2019 | Jhawar | G10L 21/0208 |
| 2019/0180740 | A1* | 6/2019 | Nandy | G10L 15/22 |

FOREIGN PATENT DOCUMENTS

| | | |
|---|---|---|
| CN | 104318924 A | 1/2015 |
| CN | 104538030 A | 4/2015 |
| CN | 104601838 A | 5/2015 |
| CN | 204499689 U | 7/2015 |
| CN | 204578621 U | 8/2015 |
| CN | 105391607 A | 3/2016 |
| CN | 105575039 A | 5/2016 |
| CN | 106231465 A | 12/2016 |
| CN | 106356060 A | 1/2017 |
| CN | 106533511 A | 3/2017 |
| CN | 106535057 A | 3/2017 |
| CN | 106782523 A | 5/2017 |
| CN | 106790971 A | 5/2017 |
| CN | 106910500 A | 6/2017 |
| CN | 107277272 A | 10/2017 |
| CN | 107394865 A | 11/2017 |
| CN | 107403621 A | 11/2017 |
| CN | 206640748 U | 11/2017 |
| CN | 107481721 A | 12/2017 |

OTHER PUBLICATIONS

International Search report dated Apr. 7, 2020, received for corresponding Chinese Application No. 201810097235.5, 6 pages.
Chinese Search Repod dated Jan. 28, 2021, received for corresponding Chinese Application No. 2018100972355, 6 pages.
Second Chinese Office Action dated Feb. 5, 2021, received for corresponding Chinese Application No. 2018100972355, 8 pages.
Decision to Grant with Supplemental Search Report dated Nov. 19, 2021, for corresponding Chinese Application No. 201810097235.5.

* cited by examiner

VOICE INTERACTION METHOD, DEVICE, APPARATUS AND SERVER

CROSS-REFERENCE TO RELATED APPLICATION

The present application claims the benefit of priority to Chinese Patent Application No. 201810097235.5, filed before the State Intellectual Property Office on Jan. 31, 2018, and entitled "Voice Interaction Method, Device, Apparatus and Server," which is incorporated in the present application by reference in its entirety.

TECHNICAL FIELD

The present disclosure relates to the field of voice recognition, and in particular, to a voice interaction method, device, apparatus and server.

BACKGROUND

At present, due to development of voice recognition technology, a mobile terminal (MT), such as a mobile phone, a tablet personal computer, etc., is usually controlled by voice recognition, such as making a call, etc.

However, for a mobile terminal, in particular for a mobile phone, power consumption of the mobile phone will be increased if a voice recognition function is enabled. Moreover, an application with a built-in voice recognition function is required to be running for a long time for the voice recognition, which will consume a large amount of power.

In addition, when controlling the mobile phone with voice, voice information as collected usually contains useless voice information. For example, in a noisy environment, the voice information as collected usually includes other voices from persons other than the user of the mobile phone, as well as some environmental noises. In this case, the mobile phone will perform voice recognition even though the user does not issue a voice instruction, thereby increasing a calculation amount and further increasing the power consumption. Moreover, due to less than two sockets for the microphone possibly being provided in the mobile phone, the efficiency for collecting voice information is low, and it is usually required for the user to put a microphone on his lips and increasing his voice volume to enable a voice instruction to be collected and recognized.

SUMMARY

A voice interaction method, device, apparatus and server are provided by embodiments of the present disclosure, so as to at least solve the above technical problems in the existing technology.

According to a first aspect, an embodiment of the present disclosure provides voice interaction method, applied to a wearable set, the method including:

collecting voice information through at least two microphones;

processing the voice information and determining that the voice information comprises an effective voice instruction; wherein the effective voice instruction is issued by a user for a mobile terminal; and transmitting the effective voice instruction to the mobile terminal.

With reference to the first aspect, in a first implementation of the first aspect of the present disclosure, the processing the voice information and determining that the voice information comprises an effective voice instruction includes:

filtering out noises in the voice information by digital signal processing to obtain user voice information; and determining that the user voice information comprises the effective voice instruction.

With reference to the first aspect, in a second implementation of the first aspect of the present disclosure, the determining that the voice information comprises an effective voice instruction includes:

detecting a preset wake-up word in the voice information; and determining that the voice information comprises an effective voice instruction in a case that the voice information comprises the preset wake-up word.

With reference to the first aspect, in a second implementation of the first aspect of the present disclosure, the method further includes:

receiving a playing instruction from the mobile terminal to play according to the playing instruction.

According to a second aspect, an embodiment of the present disclosure provides a voice interaction method, applied to a mobile terminal, the method including:

receiving an effective voice instruction from a wearable device; wherein the effective voice instruction is issued by a user for the mobile terminal; and instructing an application to perform an operation related to the effective voice instruction, in response to the effective voice instruction.

With reference to the second aspect, in a first implementation of the second aspect of the present disclosure, the instructing an application to perform an operation related to the effective voice instruction, in response to the effective voice instruction, includes:

determining that the effective voice instruction is related to an audio file;

instructing an audio playing application to open the audio file; and sending a playing instruction to the wearable device, and muting the audio playing application; wherein the playing instruction instructs the wearable device to play the audio file.

According to a third aspect, an embodiment of the present disclosure provides a voice interaction device, applied to a wearable set, including:

a voice collecting module configured for collecting a voice information through at least two microphone;

a voice processing module configured for processing the voice information and determining that the voice information comprises an effective voice instruction; wherein the effective voice instruction is issued by a user for a mobile terminal; and a voice transmitting module configured for transmitting the effective voice instruction to the mobile terminal.

According to a fourth aspect, an embodiment of the present disclosure provides a voice interaction device, applied to a mobile terminal, including:

a voice receiving module configured for receiving an effective voice instruction from a wearable device; wherein the effective voice instruction is issued by a user for the mobile terminal; and an operation instructing module configured for instructing an application to perform an operation related to the effective voice instruction, in response to the effective voice instruction.

According to a fifth aspect, an embodiment of the present disclosure provides an apparatus, including:

one or more processors;

storage means for storing one or more programs, communication interface, configured to communicate the processor and storage means to an external apparatus;

the one or more processors execute the one or more programs, to implement the method of the first aspect.

According to a sixth aspect, an embodiment of the present disclosure provides a sever, including:

one or more processors;

storage means for storing one or more programs;

communication interface, configured to communicate the processor and storage means to an external apparatus;

the one or more processors execute the one or more programs, to implement the method of the second aspect.

According to a seventh aspect, an embodiment of the present disclosure provides a computer-readable storage medium for storing computer software instructions used by the voice interaction device, including a program for executing the voice interaction method in the first aspect.

According to an eighth aspect, an embodiment of the present disclosure provides a computer-readable storage medium for storing computer software instructions used by the voice interaction device, including a program for executing the voice interaction method in the second aspect.

One or more of the above technical solutions has the following advantages or beneficial effects: in an embodiment of the present disclosure, the processing of the voice information is assigned to an external device, which reduces the power consumption of a mobile terminal; and a voice information is collected by at least two microphones to improve an efficiency and quality of a voice collection.

The above summary is for the purpose of the specification only and is not intended to be limiting in any way. In addition to the illustrative aspects, embodiments, and features described above, further aspects, embodiments, and features of the present disclosure will be readily understood by reference to the drawings and the following detailed description.

BRIEF DESCRIPTION OF THE DRAWINGS

In the drawings, unless otherwise specified, identical reference numerals will be used throughout the drawings to refer to identical or similar parts or elements. The drawings are not necessarily drawn to scale. It should be understood that these drawings depict only some embodiments disclosed in accordance with the present disclosure and are not to be considered as limiting the scope of the present disclosure.

DETAILED DESCRIPTION OF THE EMBODIMENTS

In the following, only certain exemplary embodiments are briefly described. As those skilled in the art would realize, the described embodiments may be modified in various different ways, all without departing from the spirit or scope of the present disclosure. Accordingly, the drawings and description are to be regarded as illustrative in nature and not restrictive.

Figure 1:
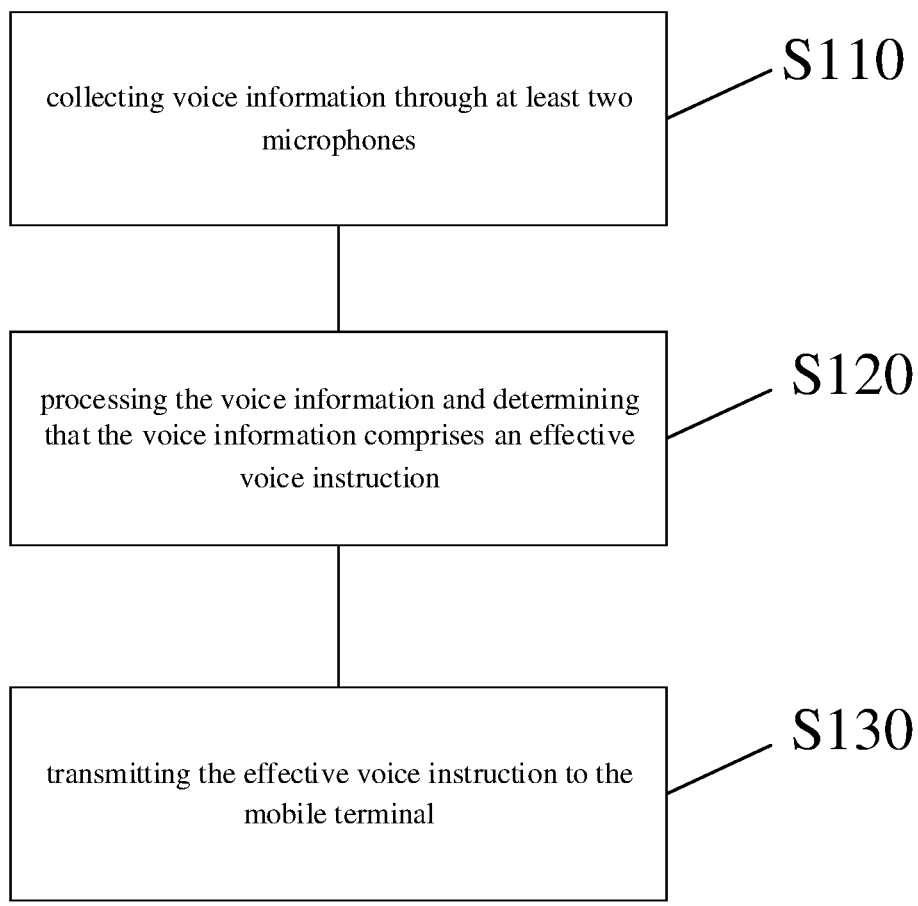
FIG. 1 is a flow chart of a voice interaction method according to an embodiment of the present disclosure.

FIG. 1 shows a flow chart of a voice interaction method 100 according to an embodiment of the present disclosure. The voice interaction method shown in FIG. 1 may include the following steps S110-S130.

S110, collecting voice information through at least two microphones.

At present, it is difficult to collect voice information with more than two microphones in a mobile terminal due to the limitations on hardware. Therefore, the efficiency of collecting voice information is low. In an embodiment of the present disclosure, the method 100 may be applied to a wearable device provided with at least two microphones.

The wearable device according to an embodiment of the present disclosure may be a compact device, for example, it may be wearable by a user, such as a tie bar, a bracelet, a brooch and the like. It does not occupy too much space and sometimes it may play a decorative role.

In a preferred embodiment of the present disclosure, the wearable device may be shaped to be a quadrate, or a quadrate curved at each corner, so that the shape of the wearable device is seemingly smoother and the wearable device is easy to be carried. In an alternative embodiment, the wearable device may be shaped to be a polygonal cylinder. In actual, the wearable device of the embodiments of the present disclosure may have any form which is point-symmetric, so that it may be easy to be firmly disposed in a wearable shell. However, it is understood that the wearable device may be shaped to be circular, as long as several fixed means are added to avoid the microphone provided on the wearable device moving easily.

In addition, in order to further improve the efficiency of collecting voice information, it is possible to provide two sockets for the microphones in each direction of the wearable device, and a trumpet serving as a playing means in one of the directions.

S120, processing the voice information and determining that the voice information comprises an effective voice instruction.

In reality, there may be a plurality of sound sources other than the user of the wearable device in the environment where the user is located. For example, in a case that the user is in a public transport means, voice information collected by the microphone does not only include voice information issued by the user, but also includes voice information from the station broadcast of the public transport means, surrounding passengers, even a trumpet of the public transport means. At this time, it is required to process the collected voice information.

In a preferred embodiment of the present disclosure, S120 may include:

filtering out noises in the voice information by digital signal processing (DSP) to obtain user voice information; and determining that the user voice information comprises the effective voice instruction.

DSP is a common signal processing method, characterized in that it may perform various signal processing algorithms quickly and with a low power consumption. In an embodiment of the present disclosure, the filtering out noises in the voice information through DSP, that is, the noises that are not from the user may be performed by any one of signal processing algorithms and will not be described herein.

It is understood that the user voice information may not be issued for control the mobile terminal. For example, the user may only have a daily conversation with a person around him, rather than control the mobile terminal. Therefore, it is necessary to determine whether the user voice information includes an effective voice instruction. In an embodiment of the present disclosure, the effective voice instruction may be a instruction issued by the user for the mobile terminal.

In a preferred embodiment of the present disclosure, the determining that the user voice information includes an effective voice instruction includes:

detecting a preset wake-up word in the voice information; and determining that the voice information comprises an effective voice instruction in a case that the voice information comprises the preset wake-up word.

In an embodiment of the present disclosure, the wake-up word may be determined as required, which may be default or set by the user, for waking up the mobile terminal. The embodiment of the present disclosure is described in detail through a wake-up word "xiaodu" as an example. For example, in a case that a voice instruction of "xiaodu, play <Star Wars 7>" is issued by a user, this voice instruction will be determined as an effective voice instruction.

S130, transmitting the effective voice instruction to the mobile terminal.

In the method 100, the power consumption in a mobile terminal is reduced by collecting voice information though at least two microphones and assigning the voice processing to the wearable device.

Figure 2:
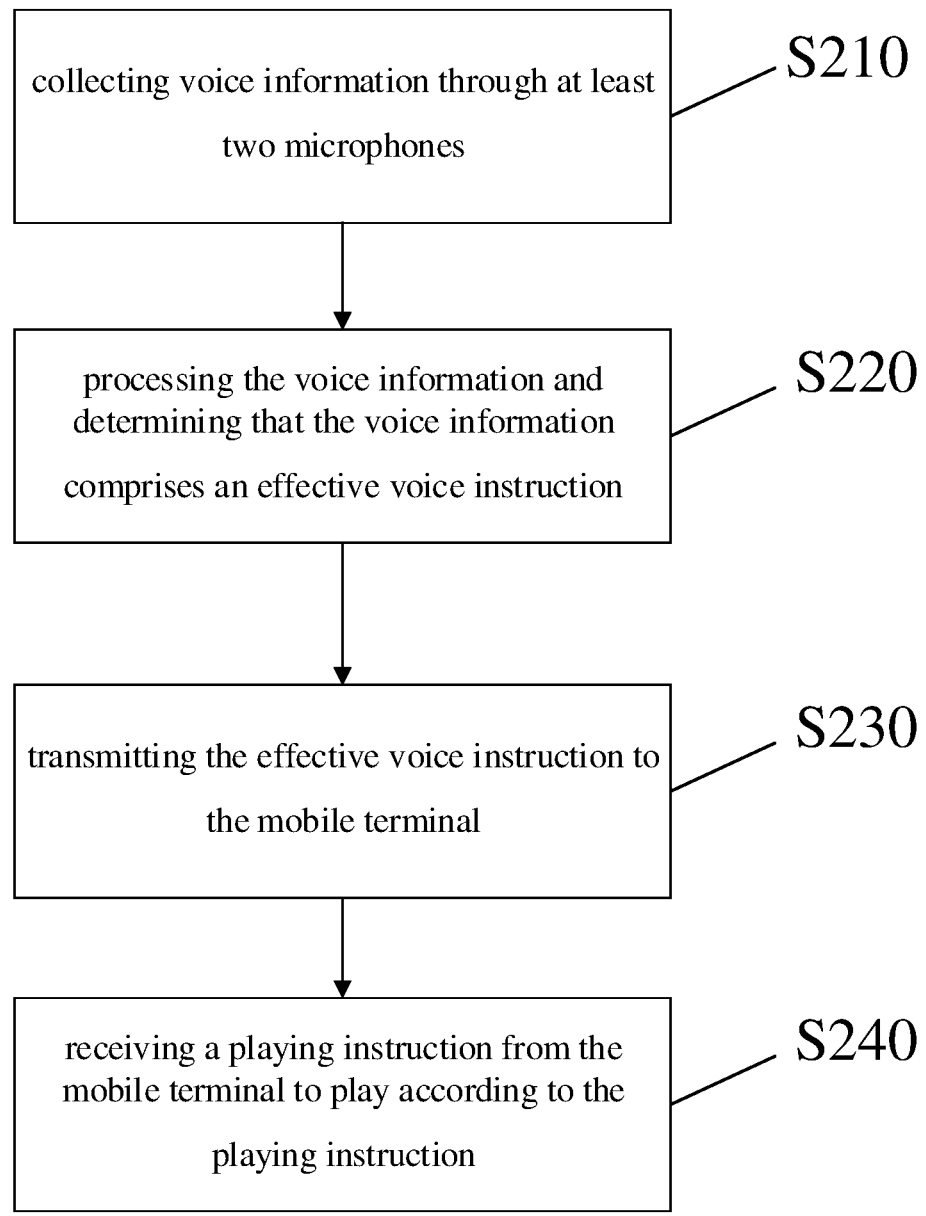
FIG. 2 is a flow chart of a voice interaction method according to another embodiment of the present disclosure.

FIG. 2 shows a flow chart of a voice interaction method 200 according to another embodiment of the present disclosure. The method 200 may include the following steps S210-S230.

S210, collecting voice information through at least two microphones;

S220, processing the voice information and determining that the voice information comprises an effective voice instruction; wherein the effective voice instruction is issued by a user for a mobile terminal; and S230, transmitting the effective voice instruction to the mobile terminal.

The steps S210-S230 are identical with the steps S110-S130, and will not be described herein.

The method 200 may further include:

S240, receiving a playing instruction from the mobile terminal to play according to the playing instruction.

In order to enable functions of the wearable device more versatile, it may be used as a playing device to play audio under an instruction from the mobile terminal. In particular, the wearable device and the mobile terminal may communicate with each other though blue tooth.

Figure 3:
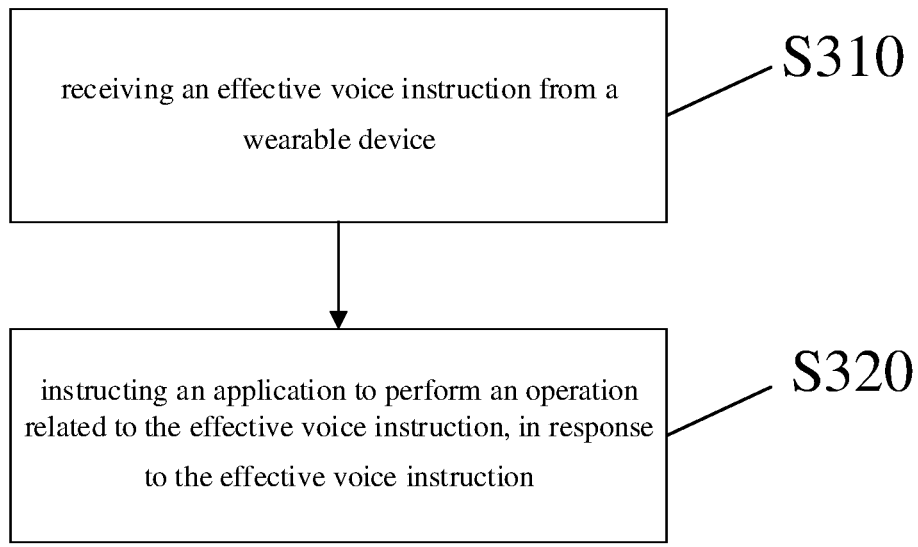
FIG. 3 is a flow chart of a voice interaction method according to another embodiment of the present disclosure.

FIG. 3 shows a flow chart of a voice interaction method 300 according to another embodiment of the present disclosure. The method 300 is applied to a mobile terminal and may include the following steps S310-S320.

S310, receiving an effective voice instruction from a wearable device.

In an embodiment of the present disclosure, the effective voice is a voice instruction issued by a user for the mobile terminal and preferably contains a preset wake-up word.

S320, instructing an application to perform an operation related to the effective voice instruction, in response to the effective voice instruction.

In an embodiment of the present disclosure, the method 300 may be executed by a separated application. Because this application may have only one function to execute the method 300, the required power consumption is very low and the application does not occupy too much memory of the mobile terminal. Further, the application may be stopped in a case that no effective voice instruction is received, so that the power consumption of the mobile terminal is further reduced.

With reference to a specific example, the step S320 is described. In a case that the effective voice instruction is "xiaodu, play <Journey to the West>" and the effective voice instruction is associated with playing a video, a video playing application is instructed to play the <Journey to the West> according to the above voice instruction.

Figure 4:
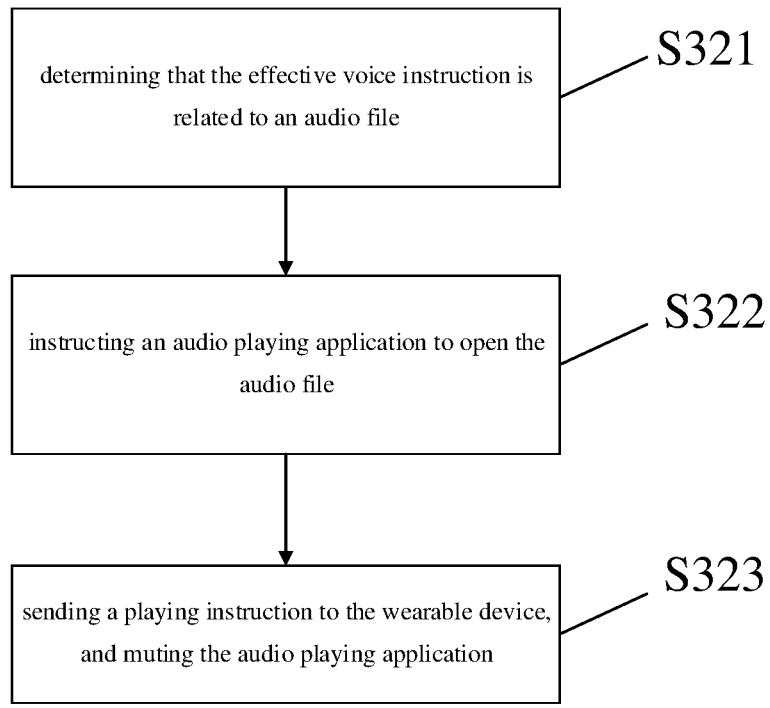
FIG. 4 is a flow chart of a method for instructing audio play according to another embodiment of the present disclosure.

Preferably, in a case that an effective voice instruction is related to audio playing, the wearable device may play audio and the power consumption of the mobile terminal is further reduced. In such case, as shown in FIG. 4, S320 may include:

S321, determining that the effective voice instruction is related to an audio file;

S322, instructing an audio playing application to open the audio file; and

S323, sending a playing instruction to the wearable device, and muting the audio playing application; wherein the playing instruction instructs the wearable device to play the audio file.

In this case, an audio file is played by the wearable device and the audio playing application in a mobile terminal only controls the playing without outputting audio, that is, be muted. Thereby, it is possible to further reduce the power consumption of the mobile terminal.

Figure 5:
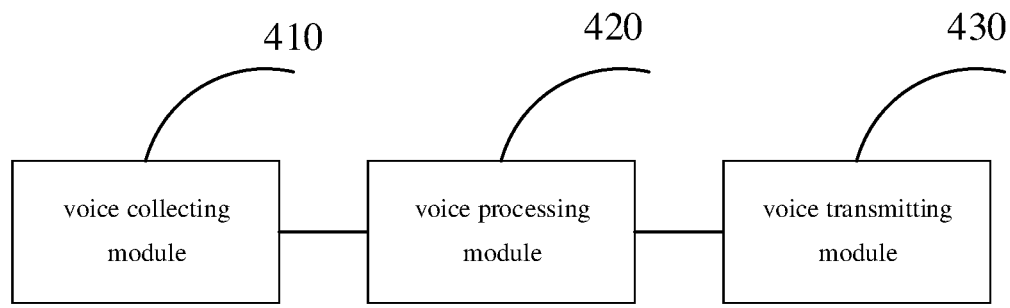
FIG. 5 is a structural block diagram of a voice interaction device according to an embodiment of the present disclosure.

FIG. 5 is a structural block diagram of a voice interaction device according to an embodiment of the present disclosure. A device 400 may be applied to a wearable set, and may include:

a voice collecting module 410 configured for collecting a voice information through at least two microphone;

a voice processing module 420 configured for processing the voice information and determining that the voice information comprises an effective voice instruction; wherein the effective voice instruction is issued by a user for a mobile terminal; and a voice transmitting module 430 configured for transmitting the effective voice instruction to the mobile terminal.

Preferably, the voice processing module 420 may include:

a filtering unit configured for filtering out noises in the voice information by digital signal processing to obtain user voice information; and an instruction determining unit configured for determining that the user voice information comprises the effective voice instruction.

Preferably, the voice processing module 420 may is further configured for:

detecting a preset wake-up word in the voice information; and determining that the voice information comprises an effective voice instruction in a case that the voice information comprises the preset wake-up word.

Preferably, the device 400 may further include:

a playing module configured for receiving a playing instruction from the mobile terminal to play according to the playing instruction.

Figure 6:
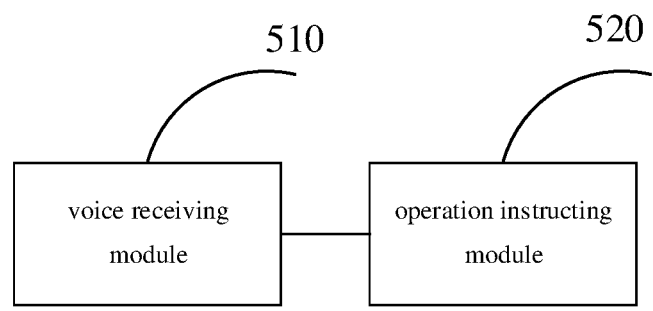
FIG. 6 is a structural block diagram of a voice interaction device according to another embodiment of the present disclosure.

FIG. 6 is a structural block diagram of a voice interaction device 500 according to another embodiment of the present disclosure. The voice interaction device 500 may be applied to a mobile terminal and include:

a voice receiving module 510 configured for receiving an effective voice instruction from a wearable device; wherein the effective voice instruction is issued by a user for the mobile terminal; and an operation instructing module 520 configured for instructing an application to perform an operation related to the effective voice instruction, in response to the effective voice instruction.

Figure 7:
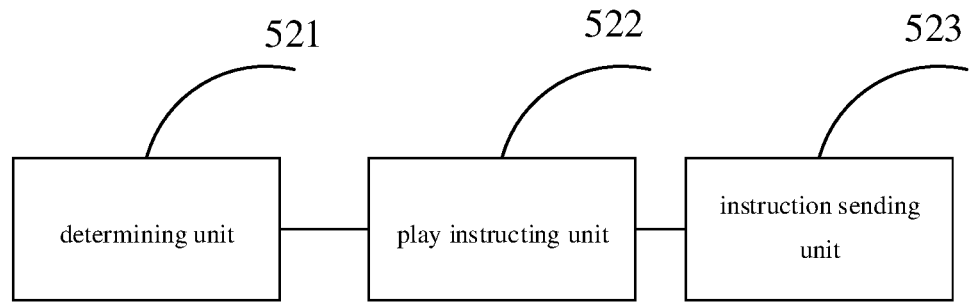
FIG. 7 is a structural block diagram of an operation instructing module according to another embodiment of the present disclosure.

In particular, as shown in FIG. 7, the operating control module 520 may include:

a determining unit 521 configured for determining that the effective voice instruction is related to an audio file;

a play instructing unit 522 configured for instructing an audio playing application to open the audio file; and an instruction sending unit 523 configured for sending a playing instruction to the wearable device, and muting the audio playing application; wherein the playing instruction instructs the wearable device to play the audio file.

Figure 8:
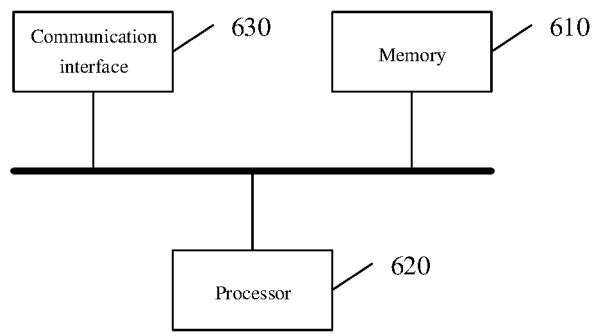
FIG. 8 is a schematic diagram of an apparatus according to an embodiment of the present disclosure.

FIG. 8 is a schematic diagram of an apparatus 600 according to another embodiment of the present disclosure. As shown in FIG. 8, the device includes a memory 610 and a processor 620. The memory 610 stores a computer program executable on the processor 620. When the processor 620 executes the computer program, the information exchanging method in the foregoing embodiment is implemented. The number of the memory 610 and the processor 620 may be one or more.

The apparatus also includes: a communication interface 630 configured to communicate with external devices and exchange data; and a memory 610 which may include a high-speed RAM memory and may also include a non-volatile memory, such as at least one magnetic disk memory.

If the memory 610, the processor 620, and the communication interface 630 are implemented independently, the memory 610, the processor 620, and the communication interface 630 may be connected to each other through a bus and communicate with each other. The bus may be an ISA (Industry Standard Architecture) bus, a PCI (Peripheral Component) bus, an EISA (Extended Industry Standard Component) bus, or the like. The bus can be divided into an address bus, a data bus, a control bus, and the like. For ease of illustration, only one bold line is shown in FIG. 8, but it does not mean that there is only one bus or one type of bus.

Optionally, in a specific implementation, if the memory 610, the processor 620, and the communication interface 630 are integrated on one chip, the memory 610, the processor 620, and the communication interface 630 may implement mutual communication through an internal interface.

In the description of the specification, the description of the terms "one embodiment," "some embodiments," "an example," "a specific example," or "some examples" and the like means the specific features, structures, materials, or characteristics described in connection with the embodiment or example are included in at least one embodiment or example of the present disclosure. Furthermore, the specific features, structures, materials, or characteristics described may be combined in any suitable manner in any one or more of the embodiments or examples. In addition, different embodiments or examples described in this specification and features of different embodiments or examples may be incorporated and combined by those skilled in the art without mutual contradiction.

In addition, the terms "first" and "second" are used for descriptive purposes only and are not to be construed as indicating or implying relative importance or implicitly indicating the number of indicated technical features. Thus, features defining "first" and "second" may explicitly or implicitly include at least one of the features. In the description of the present disclosure, "a plurality of" means two or more, unless expressly limited otherwise.

Any process or method descriptions described in flowcharts or otherwise herein may be understood as representing modules, segments or portions of code that include one or more executable instructions for implementing the steps of a particular logic function or process. The scope of the preferred embodiments of the present disclosure includes additional implementations where the functions may not be performed in the order shown or discussed, including according to the functions involved, in substantially simultaneous or in reverse order, which should be understood by those skilled in the art to which the embodiment of the present disclosure belongs.

Logic and/or steps, which are represented in the flowcharts or otherwise described herein, for example, may be thought of as a sequencing listing of executable instructions for implementing logic functions, which may be embodied in any computer-readable medium, for use by or in connection with an instruction execution system, device, or apparatus (such as a computer-based system, a processor-included system, or other system that fetch instructions from an instruction execution system, device, or apparatus and execute the instructions). For the purposes of this specification, a "computer-readable medium" may be any device that can contain, store, communicate, propagate, or transport the program for use by or in connection with the instruction execution system, device, or apparatus. More specific examples (not a non-exhaustive list) of the computer-readable media include the following: electrical connections (electronic devices) having one or more wires, a wearable computer disk cartridge (magnetic device), random access memory (RAM), read only memory (ROM), erasable programmable read only memory (EPROM or flash memory), optical fiber devices, and wearable read only memory (CDROM). In addition, the computer-readable medium can even be paper or other suitable medium upon which the program can be printed, as it may be read, for example, by optical scanning of the paper or other medium, followed by editing, interpretation or, where appropriate, process otherwise to electronically obtain the program, which is then stored in a computer memory.

It should be understood that various portions of the present disclosure may be implemented by hardware, software, firmware, or a combination thereof. In the above embodiments, multiple steps or methods may be implemented in software or firmware stored in memory and executed by a suitable instruction execution system. For example, if implemented in hardware, as in another embodiment, they may be implemented using any one or a combination of the following techniques well known in the art: discrete logic circuits having a logic gate circuit for implementing logic functions on data signals, application specific integrated circuits with suitable combinational logic gate circuits, programmable gate arrays (PGA), field programmable gate arrays (FPGAs), and the like.

Those skilled in the art may understand that all or some of the steps carried in the methods in the foregoing embodiments may be implemented by a program instructing relevant hardware. The program may be stored in a computer-readable storage medium, and when executed, one of the steps of the method embodiment or a combination thereof is included.

In addition, each of the functional units in the embodiments of the present disclosure may be integrated in one processing module, or each of the units may exist alone physically, or two or more units may be integrated in one module. The above-mentioned integrated module can be implemented in the form of hardware or in the form of software functional module. When the integrated module is implemented in the form of a software functional module and is sold or used as an independent product, the integrated module may also be stored in a computer-readable storage medium. The storage medium may be a read only memory, a magnetic disk, an optical disk, or the like.

The foregoing descriptions are merely specific embodiments of the present disclosure, but not intended to limit the protection scope of the present disclosure. Those skilled in the art may easily conceive of various changes or modifications within the technical scope disclosed herein, all these should be covered within the protection scope of the present disclosure. Therefore, the protection scope of the present disclosure should be subject to the protection scope of the claims.

What is claimed is:

1. A voice interaction method, applied to a wearable device, comprising:
   collecting, by the wearable device, voice information through at least two microphones of the wearable device, wherein the wearable device comprises two sockets for the microphones and a trumpet serving as a playing means;
   detecting, by the wearable device, whether there is a preset wake-up word in the voice information, and determining, by the wearable device, that the voice information comprises an effective voice instruction in a case where the voice information comprises the preset wake-up word, wherein the effective voice instruction is issued by a user for a mobile terminal and comprises the preset wake-up word;
   transmitting, by the wearable device, the effective voice instruction to the mobile terminal in response to determining that the voice information comprises the effective voice instruction, and instructing the mobile terminal to send a playing instruction to the wearable device in a case where the effective voice instruction is related to the playing instruction; and
   receiving, by the wearable device, the playing instruction from the mobile terminal, and performing, by the wearable device, playing according to the playing instruction,
   wherein the two sockets for the microphones are provided in each direction of the wearable device, and the trumpet serving as the playing means is provided in one direction of the wearable device.

2. The voice interaction method according to claim 1, wherein determining, by the wearable device, that the voice information comprises an effective voice instruction comprises:
   filtering out noises in the voice information by digital signal processing to obtain user voice information; and
   determining that the user voice information comprises the effective voice instruction.

3. An apparatus, comprising:
   one or more processors; and
   storage means for storing one or more programs,
   wherein the one or more processors execute the one or more programs, to implement the method of claim 1.

4. A non-transitory computer-readable storage medium storing a computer program, wherein a processor executes the program, to implement the method according to claim 1.

5. A voice interaction method, applied to a mobile terminal, comprising:
   receiving, by the mobile terminal an effective voice instruction from a wearable device; wherein the effective voice instruction is issued by a user for the mobile terminal and comprises a preset wake-up word, and wherein the wearable device comprises two sockets for microphones and a trumpet serving as a playing means;
   determining, by the mobile terminal, whether the effective voice instruction received from the wearable device is related to audio playing; and
   sending, by the mobile terminal, a playing instruction to the wearable device in response to determining that the effective voice instruction is related to the audio playing, and controlling the wearable device to perform the audio playing according to the playing instruction,
   wherein the two sockets for the microphones of the wearable device are provided in each direction of the wearable device, and the trumpet serving as the playing means is provided in one direction of the wearable device.

6. A server, comprising:
   one or more processors; and
   storage means for storing one or more programs,
   wherein the one or more processors execute the one or more programs, to implement the method of claim 5.

7. A non-transitory computer-readable storage medium storing a computer program, wherein a processor executes the program, to implement the method according to claim 5.

8. A voice interaction device, applied to a wearable set, comprising:
   a voice collecting module configured for collecting, by the wearable set, voice information through at least two microphones of the wearable set, wherein the wearable set comprises two sockets for the microphones and a trumpet serving as a playing means;
   a voice processing module configured for detecting, by the wearable set, whether there is a preset wake-up word in the voice information, and determining, by the wearable set, that the voice information comprises an effective voice instruction in a case where the voice information comprises the preset wake-up word, wherein the effective voice instruction is issued by a user for a mobile terminal and comprises the preset wake-up word;
   a voice transmitting module configured for transmitting, by the wearable set, the effective voice instruction to the mobile terminal in response to determining that the voice information comprises the effective voice instruction, and instructing the mobile terminal to send a playing instruction related to audio playing to the wearable set in a case where the effective voice instruction is related to the audio playing; and
   a playing module configured for receiving, by the wearable set, the playing instruction from the mobile terminal, and performing, by the wearable set, playing according to the playing instruction, wherein the two sockets for the microphones are provided in each direction of the wearable set, and the trumpet serving as the playing means is provided in one direction of the wearable set.

9. The voice interaction device according to claim 8, wherein the voice processing module comprises:
  a filtering unit configured for filtering out noises in the voice information by digital signal processing to obtain user voice information; and
  an instruction determining unit configured for determining that the user voice information comprises the effective voice instruction.

10. A voice interaction device, applied to a mobile terminal, comprising:
  a voice receiving module configured for receiving an effective voice instruction from a wearable device, wherein the effective voice instruction is issued by a user for the mobile terminal and comprises a preset wake-up word, and wherein the wearable device comprises two sockets for microphones and a trumpet serving as a playing means;
  a determining module configured for determining, by the mobile terminal, whether the effective voice instruction received from the wearable device is related to audio playing; and
  an operation instructing module configured for sending, by the mobile terminal, a playing instruction to the wearable device in response to determining that the effective voice instruction is related to the audio playing, and controlling the wearable device to perform audio playing according to the playing instruction,
  wherein the two sockets for the microphones are provided in each direction of the wearable device, and the trumpet serving as the playing means is provided in one direction of the wearable device.

* * * * *